Fig. 7

March 20, 1962  L. M. POLAN ET AL  3,025,750
MAGAZINE LOADED MOTION PICTURE PROJECTOR
Filed Aug. 25, 1958  7 Sheets-Sheet 4

Fig. 3

INVENTORS
LINCOLN M. POLAN
BYRON T. CHEUVRONT, ARTHUR L. INGALLS
WILLIAM M. STROM, GEORGE A. MUIR
by: Carlson, Pitzner, Hubbard & Wolf
ATTYS.

March 20, 1962 L. M. POLAN ET AL 3,025,750
MAGAZINE LOADED MOTION PICTURE PROJECTOR
Filed Aug. 25, 1958 7 Sheets-Sheet 6

Fig.6

INVENTORS
LINCOLN M. POLAN, BYRON T. CHEUVRONT
ARTHUR L. INGALLS, WILLIAM M. STROM
GEORGE A. MUIR by: Carlson, Pitzner, Hubbard & Wolf
ATTYS.

United States Patent Office 3,025,750
Patented Mar. 20, 1962

3,025,750
MAGAZINE LOADED MOTION PICTURE PROJECTOR
Lincoln M. Polan, Huntington, W. Va., Byron T. Cheuvront, Proctorville, Ohio, Arthur L. Ingalls, Ann Arbor, Mich., and William M. Strom and George A. Muir, Binghamton, N.Y., assignors to Polan Industries Incorporated, Huntington, W. Va., a corporation of West Virginia
Filed Aug. 25, 1958, Ser. No. 757,084
9 Claims. (Cl. 88—16.2)

The present invention relates generally to motion picture projectors and, more particularly, to projectors of the type which utilize film magazines from which the film is projected without being removed.

It is the primary aim of the invention to provide a novel motion picture projector and an improved endless loop film magazine that is simply slid into the projector, whereupon the film in the magazine can be projected and the film sound track played, whether the sound track is optical or magnetic, without handling or threading the film.

It is a related but more detailed object to provide a projector and magazine of the above type which when the magazine is inserted into the projector, is effective to run the film through a complete projection cycle or program without attention from the operator. Such a projection cycle may include: warming up the electronic assemblies used for sound reproduction, detecting whether an optical or magnetic sound track is to be reproduced, starting the film picture and sound projection when the electronic parts are "warmed," stopping the film drive and "still framing" at selected points during the program, and shutting off the projector when the program has been completed.

Another object is to provide a novel endless loop film magazine as described above, which may be quickly and easily "loaded" with a film program and which will reliably maintain the film in proper operating position.

It is a further object to provide an endless loop film magazine of the above type that completely encloses the film when it is not being projected so that injurious dust and dirt cannot enter, but which automatically couples and associates the film, when the magazine is slid into the projector, with a projecting light source, sound pickup devices, a film drive mechanism including an "intermittent" unit, a sound stabilizer device, and a film sensing control system.

It is also an object to provide a film magazine as characterized above which reliably feeds film from an endless loop and maintains a fixed length of film for projection and sound pickup before recoiling the film smoothly back into the loop. It is a collateral object to provide a novel endless loop film coil support which facilitates smooth film feed and recoiling.

With more particularity, it is an object to provide a magazine as described having a film feeding arrangement which doubles back the film loop being projected so that both the front and back sides of the film are presented to the outside of the magazine; thus enabling either optical or magnetic film sound tracks to be detected and read.

It is yet another object to provide a projector and film magazine of the above character which encloses the film to protect it from damage, but which avoids overheating the enclosed film even when using a strong light source. It is an allied object to provide a novel optical system, for use with such a closed film magazine, which produces a cool light beam that will not overheat the film.

A still further object is to provide a novel film sensing system for a projector and magazine as described above, which is reliable, accurate and responsive to easily formed film markings, so that new films can be quickly organized into a desired program.

Other objects and advantages of the invention will become apparent upon reading the following detailed description and upon reference to the drawings in which.

While the invention will be described in connection with a preferred embodiment, it will be understood that we do not intend to limit the invention to that embodiment. On the contrary, we intend to cover all alternatives, modifications, and equivalents as may be included within the spirit and scope of the invention and defined by the appended claims.

Figure 1:
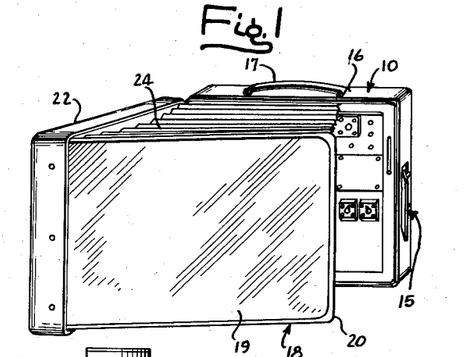
FIGURE 1 is a perspective view of a motion picture projector embodying the present invention opened into operating position.
Figure 2:
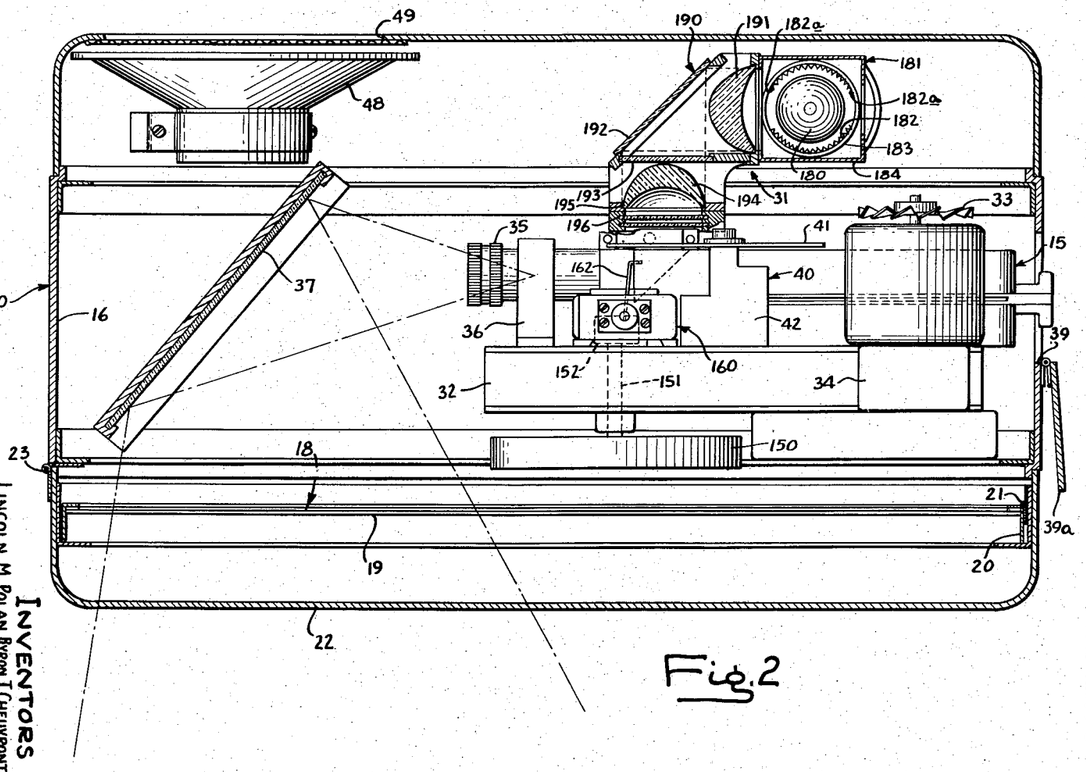
FIG. 2 is a plan view, partially in section, of the projector shown in FIG. 1 with its screen folded into carrying position.
Figure 3:
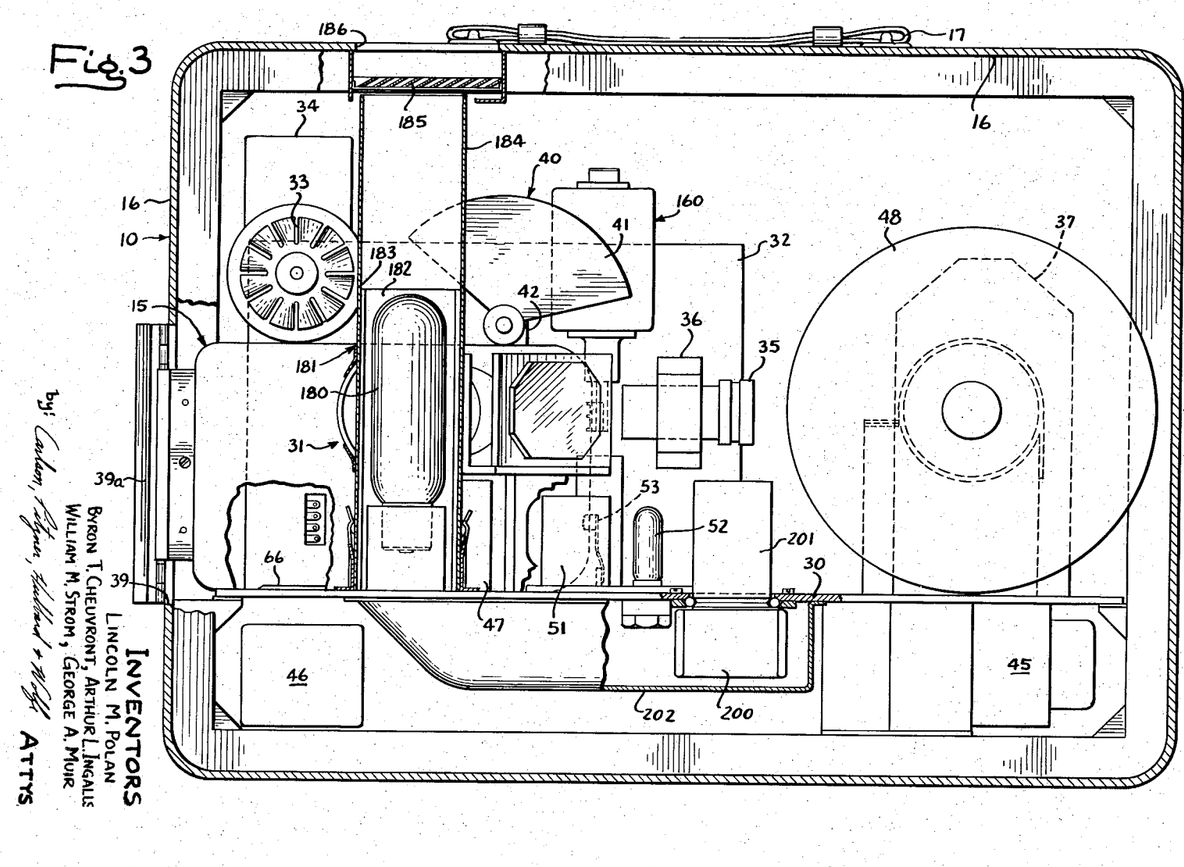
FIG. 3 is an elevation view, partially in section, of the projector shown in FIG. 2.

Turning first to FIGS. 1, 2 and 3, there is shown a motion picture projector 10 associated with a film containing magazine 15 to form a self-contained unit which embodies the present invention. The magazine 15 contains an endless loop of film comprising a complete movie program, and this film is projected by the projector without being removed from the magazine. The projector is also effective to reproduce a sound track on the film, whether of the optical or magnetic type.

GENERAL ARRANGEMENT OF THE PROJECTOR

Considering first the general arrangement of the projector 10 which embodies the invention, it will be seen that the projector includes a frame 16 which defines a portable carrying case having a convenient handle 17 secured to its top wall so that the entire unit may be readily transported. A projection screen 18, in the form of a translucent sheet 19 is mounted in a frame 20 that is hinged at 21 to the inside of a front cover 22 for the frame 16. The cover 22 is hinged at 23 to the main body of the frame. To set up the projector 10 for operation, the cover 22 is swung open to lie at substantially right angles with respect to the projector, and the screen 18 is swung about its hinge 21 so as to lie roughly parallel to the projector. If desired, a flexible shield 24 can be extended from the projector 10 so as to surround the back of the screen 18 and prevent extraneous light from striking the rear surface of the translucent sheet 19. In operation, the projector projects the film image onto the rear of the translucent sheet 19 so that it may be viewed from the front of the projector.

Turning next to the orientation of the various assemblies making up the projector 10, it can be seen in FIG. 3 that the projector case 16 is divided into upper and lower sections by a base frame plate 30. Mounted on the upper surface of the frame plate 30 is a projection lamp and condenser assembly 31 which provides a strong light beam for projecting the film.

Standing upright on the plate 30 is a gear box 32 to which a drive motor 33 is secured. The motor 33 is coupled to the driving mechanism in the gear box 32 through a solenoid controlled clutch of which only the solenoid 34 is shown. The solenoid controlled clutch drive is of the standard type wherein energization of the solenoid 34 is effective to declutch a gear train in the gear box 32.

In order to enlarge a film image for projection, a projecting lens system 35 is mounted on a bracket 36 secured to the side of the gear case 32. The lens system is adjustably mounted in the bracket 36 for purposes of focusing, and is aimed at a mirror 37 which is supported upright on the frame base plate 30. The mirror 37 is effective to reflect the image projected by the lens system 35 onto the rear of the translucent sheet 19 forming the projection screen 18. It will be understood that although the mirror 37 reverses the projected film image, that image is projected against the rear of the translucent sheet which is viewed from the front. Therefore the viewer will observe the image in its correct left-to-right relation.

The operating position for the magazine 15 within the projector 10 lies behind the lens system 35 and between the gear box 32 and the lamp and condenser assembly 31. The magazine is placed in operating position by being inserted through an opening 39 in the frame 16. This opening is closed by a door 39a when the projector is transported.

For the purpose of regularly interrupting the projected image while the film is being advanced, a shutter assembly 40 is provided. The shutter assembly includes a fan shaped shutter 41 journaled in a housing 42 secured to the side of the gear case 32 and driven by the drive motor 33 through suitable gearing provided in the gear case. During its rotation, the shutter 41 passes through the light beam transmitted by the lamp and condenser assembly 31 to the film so as to momentarily prevent projection of the film image. The speed of rotation of the shutter 41 is selected so that the light beam is cut off during those intervals when the motion picture film in the magazine 15 is being advanced.

Providing a sound reproducing system for the projector 10 are electronic components including a power supply assembly 45, an amplifier 46, and a pre-amplifier 47. A speaker unit 48 is secured to the frame 16 adjacent a rear aperture 49 formed in the projector case.

So that the projector 10 may reproduce film sound tracks of both the optical and magnetic type, an exciter lamp assembly 51 and a photocell optical sound pickup 52 are provided together with a magnetic sound track pickup 53.

*The Film Magazine*

Figures 4, 5, 8, 9:
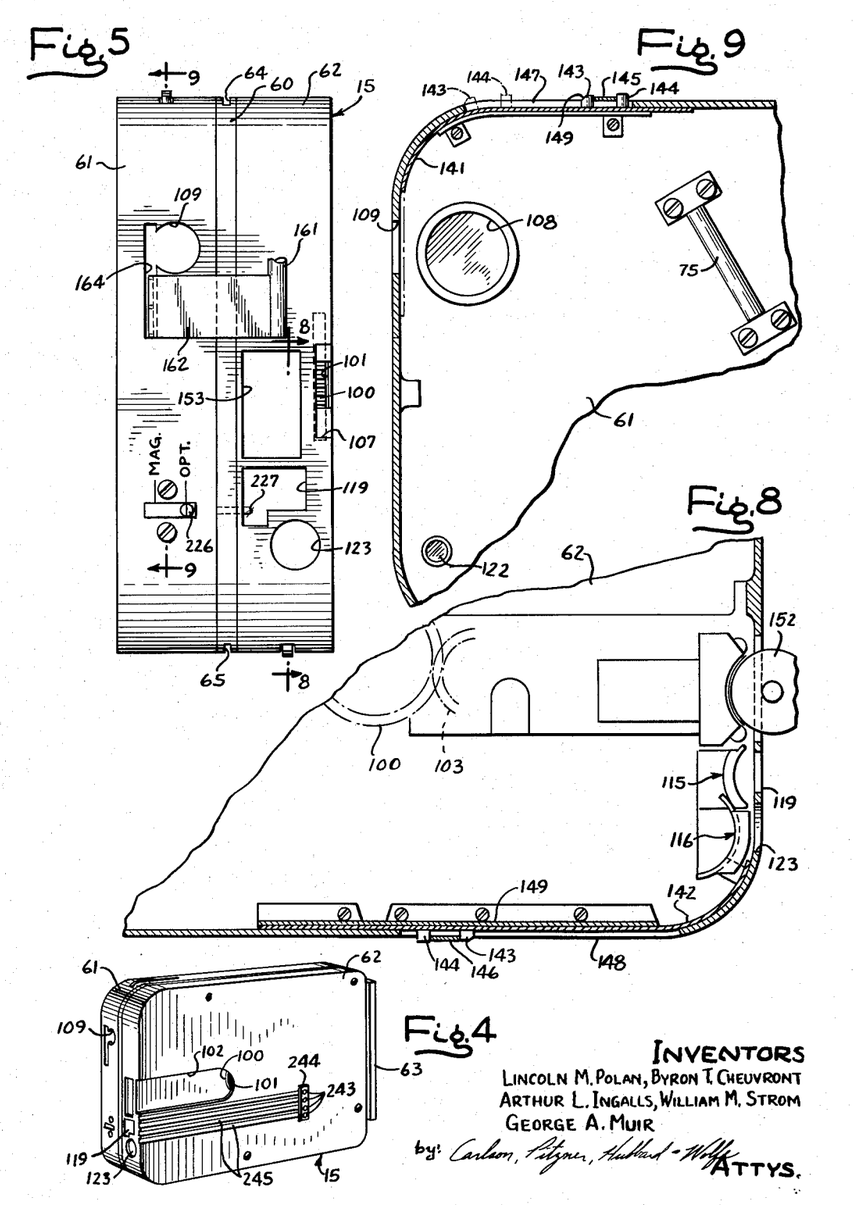
FIG. 4 is a perspective view of a film magazine embodying an aspect of the invention and which is utilized in the projector shown in FIG. 1.
FIG. 5 is a front elevation view showing the magazine appearing in FIG. 4.
FIG. 8 is a sectional view of a portion of the magazine taken approximately along the line 8—8 of FIG. 5.
FIG. 9 is a fragmentary sectional view taken approximately along the line 9—9 of FIG. 5.

The magazine 15, which embodies an important aspect of the invention, supports an endless loop of film F coiled into a roll R and enables the film to be projected without being manually handled or removed from the magazine. In the preferred embodiment, the magazine 15 is simply and rigidly formed by a central frame plate 60 which is enclosed on each side by generally cup-shaped covers 61, 62, respectively. Secured at the rear of the plate 60, so as to extend from the covers 61, 62, is a handle 63 which permits the magazine 15 to be easily inserted into, and withdrawn from, the projector 10.

Preferably, the magazine 15 is adapted to be slid into operating position within the projector 10, and for this purpose the top and bottom of the central frame plate 60 is provided with grooves 64 and 65 respectively, which fit over corresponding ribs defining a slideway for the magazine 15 in the projector case 16. Only the rib 66 which is formed on the top of the frame plate 30 and which cooperates with the groove 65 appears in the drawings (see FIG. 3), but it will be understood that a similar rib is provided on the undersides of the motor 33 and the shutter housing 42 so that the magazine 15 is guided and supported at top and bottom when inserted into the projector 10.

In order to support and store the roll of film R in the magazine, a pair of spools 71, 72 are journaled on one side of the frame plate 60 and the film roll is mounted on the two spools. So that the film remains properly coiled in the storage loop R, a set of elongated rollers 73, 74 are journaled on the frame plate 60 and engage one side edge of the film. Opposite the rollers 73, 74 are corresponding rollers journaled in the cover 61, of which only the roller 75 is shown (see FIG. 9). When the cover 61 is in place, the roller 75 lies parallel to, and spaced from, the roller 74 so that the pair of rollers engage opposite side edges of the film in the roll R. It can thus be seen that the spools 71, 72 and the film side edge engaging roller pairs, provide a positive, but substantially frictionless, support for the film roll R.

Figure 6:
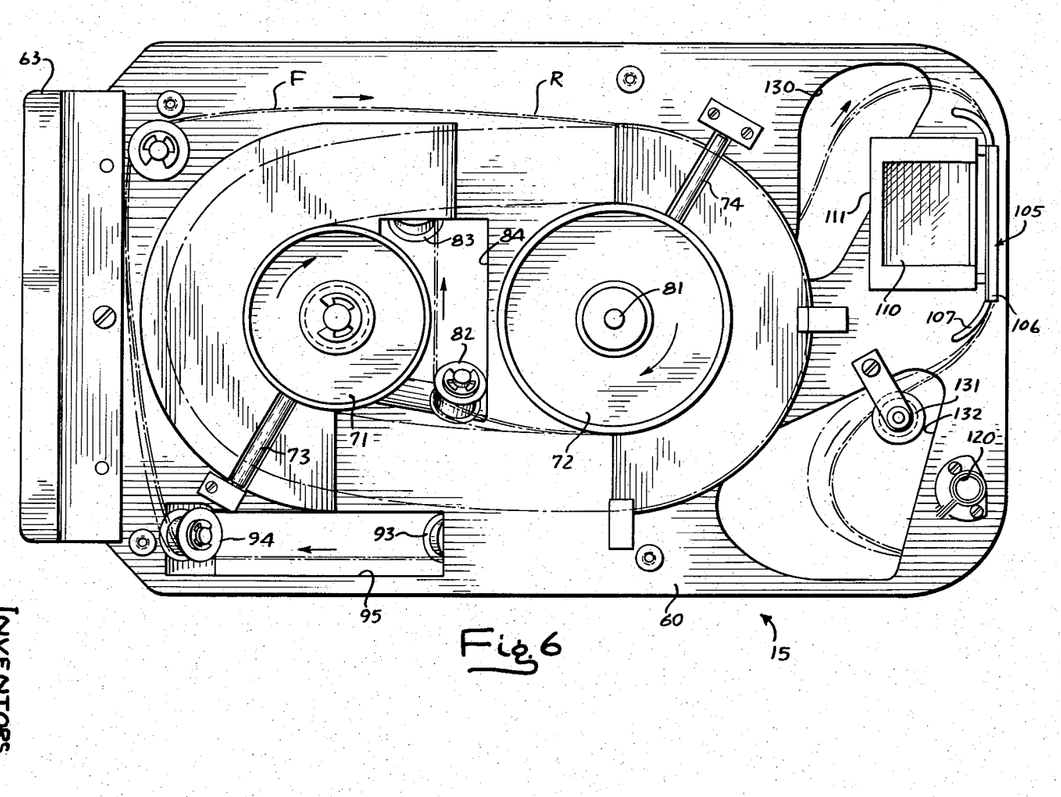
FIGS. 6 and 7 are right and left side views of the magazine appearing in FIG. 4 with the covers removed.

For the purpose of both feeding the film from the loop R and returning the film to the loop, a sprocket 80 is journaled on the frame plate 60 and is rotatably coupled to the spool 72. In the illustrated embodiment, the sprocket 80 and the spool 72 are positioned on opposite sides of the frame plate 60 and are secured to a common axle 81 so that they rotate in unison. When the sprocket 80 and the spool 72 are rotated in the direction of the arrows shown in FIGS. 6 and 7, the film roll R is turned by the spool 72 and film is drawn from the center of the roll about a pair of inclined roller 82, 83 through an aperture 84 formed in the plate 60. The film is then drawn through a pair of guide pins 86 and directed about a plurality of rollers 85 for a purpose brought out below. Next, the film is urged into engagement with the sprocket wheel 80 by a pair of sprocket engaging rollers 88, 89.

Figure 7:
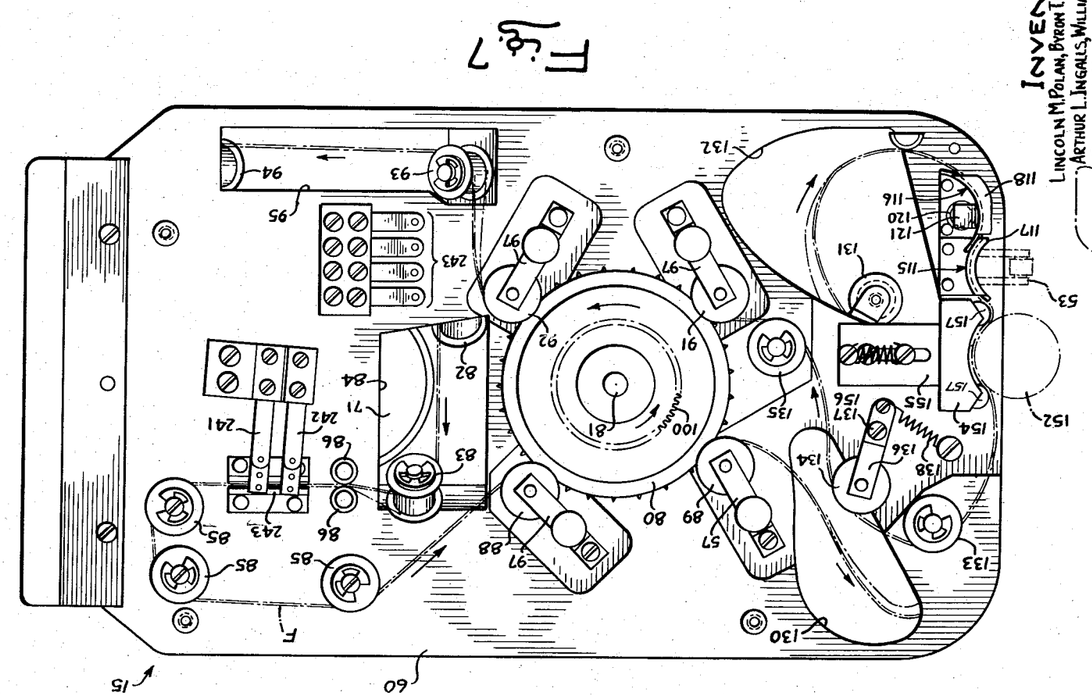

The sprocket 80 returns the film to the roll R through the provision of a second pair of sprocket engaging rollers 91, 92, which press the returning film against the sprocket so that the film is fed about the inclined rollers 93, 94 through an aperture 95 in the plate 60, and thence to the outside of the roll R. Since the film is both fed from the roll R and returned to that roll by the single sprocket 80, it will be noted that a film loop of predetermined length is positively maintained for projection and sound playback.

In the preferred embodiment, the sprocket engaging roller pairs 88, 89 and 91, 92 are journaled on respective ones of a series of movable arms 97 so that the rollers can be swung away from the sprocket 80 when the magazine is loaded with a roll of film.

In order to rotate the sprocket 80 and the spool 72, a driving gear 100 is secured to the shaft 81 so as to extend through an aperture 101 formed in the cover 62 of the magazine. In the illustrated embodiment, the aperture 101 lies at the end of a depression 102 formed in the outer face of the cover 62. The arrangement is such that when the magazine 15 is slid into operating position alongside of the gear case 32 (see FIG. 10), the depression 102 receives a driving gear 103 mounted on the case 32 so that the gear 100 moves into meshing engagement with the gear 103. The gear 103 is operatively coupled to the drive motor 33.

It can therefore be seen that when the magazine 15 is in its operating position, the engagement of the gears 100 and 103 couples the drive motor 33 with both the film advancing sprocket 80 and the driven film spool 72.

For the purpose of projecting the picture images on the film, the magazine 15 is provided with both a picture gate and means for passing a projecting light beam through the picture gate. In the preferred embodiment, a picture gate 105 is mounted on the frame plate 60 on the same side of the plate which carries the spools 71, 72. The picture gate includes closely spaced front and rear apertured plates 106, 107, between which the film is drawn.

Figure 10:
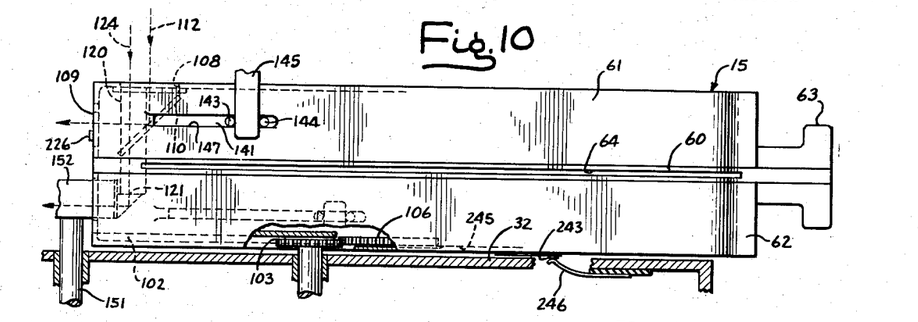
FIG. 10 is a top view of the film magazine shown in FIG. 4, operatively coupled to the projector.
Figure 11:
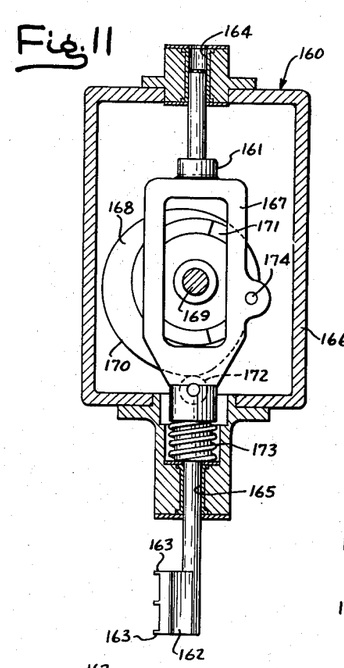
FIG. 11 is a vertical section of the intermittent mechanism utilized in the projector shown in FIG. 1.
Figure 12:
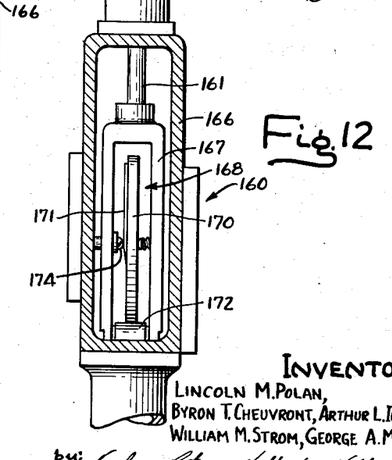
FIG. 12 is a side sectional view of the intermittent shown in FIG. 11.
Figure 13:
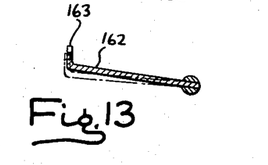
FIG. 13 is a section taken along the line 13—13 of FIG. 11.

The means for passing a projecting light beam through the film at the picture gate 105 includes a windowed side aperture 108 and a front aperture 109 formed in the cover 61 (see FIGS. 9 and 10). Positioned behind the gate 105 is a mirror 110 held by a frame 111 mounted on the magazine plate 60 so that the mirror is disposed at a 45° angle to the two apertures 108, 109.

When the magazine 15 is in operating position (see FIG. 10), a projecting light beam 112 enters the windowed side aperture 108, strikes the right-angled mirror 110 and is deflected through the film at the picture gate 105. The projected film image passes through the front aperture 109 and into the projecting lens system 35 (see FIG. 2).

For the purpose of detecting and reproducing the film sound track, the magazine 15 is provided with a pair of sound gates 115 and 116 (see FIG. 7). The sound gates are secured to the central frame plate 60 of the magazine and are mounted on the same side of this plate as is the sprocket 80. The sound gates 115, 116 are formed by curved channel members 117 and 118, respectively, which are disposed so as to define a serpentine path for the film passing therethrough. This configuration imposes a drag on the film being drawn through the sound gates and thus tends to stabilize the velocity of the film so that it moves smoothly.

The sound gate 115 is the magnetic sound gate, and in order to permit the magnetic sound pickup 53 to contact the film in this gate, an aperture 119 is formed in the front of the magazine cover 62 (see FIG. 5). When the magazine is in operating position, the magnetic sound pickup 53 enters the aperture 119 and contacts the film as it is drawn through the gate 115.

The sound gate 116 is the optical sound gate and means are provided for passing a light beam from the exciter lamp 51 through the film at the gate 116 to the photocell optical pickup 52. In the preferred embodiment, this means includes a tube 120 extending through the magazine frame plate 60 (see FIG. 6) and having a triangular prism 121 secured at one end behind the film gate 118 (see FIG. 7). In addition, a windowed aperture 122 is formed in the side of the cover 61 and an aperture 123 is formed in the front of the cover 62.

When the magazine 15 is in operating position (see FIG. 10), a light beam 124 from the exciter lamp 51 enters the windowed aperture 122, passes along the tube 120 through the frame plate 60, and is deflected by the triangular prism 121 forwardly through the film at the sound gate 118. The sound track image then passes through the aperture 123 to the optical sound pickup 52.

As one of the features of the invention, it will be noted that the picture gate 105 and the two sound gates 115, 116 are in adjacent planes, and means are provided to double-back the film passing through these gates so that both the front and back sides of the film are presented to the outside of the magazine. In the present instance, this is accomplished by feeding the film from the sprocket 80 through an opening 130 in the magazine plate 60, passing the film through the picture gate 105, and then moving the film around a guide roller 131 and through a second opening 132, whereupon the film is doubled back and moved through the sound gates 115, 116. From the sound gates 115, 116, the film is drawn about the rollers 133, 134 and 135 by the sprocket 80. Preferably, the roller 134 is journaled on an arm 136 which is biased about its pivot point 137 by a tensioned helical spring 138 so that the roller is effective to take up any slack in the length of film passing through the picture and sound gates.

Doubling back the film in the manner described above between the picture gate 105 and the sound gates 115, 116, makes it possible to detect either an optical or a magnetic sound track on the film. Those skilled in the art will appreciate that it makes no difference from which side of the film the optical sound track is "read," but that the magnetic material which is impressed with a magnetic sound track is conventionally located on the back side of a film. Since the film must pass through the picture gate 105 with its front side facing outwardly of the magazine, the doubling back of the film through the sound gates presents the rear side of the film to the outside of the magazine as it is moved through the magnetic sound gate 115. Therefore, the magnetic sound pickup 53 is able to detect a magnetic sound track. Thus, the magazine 15 may be loaded with film having either type of sound track.

It is important to note that all of the film guiding or contacting elements in the magazine 15 are mounted on the single plate 60. The magazine may therefore be easily loaded with a film program. Once the film is properly threaded on the plate 60, the covers 61, 62 are simply fitted in place and the film loading operation is completed.

It is another feature of the invention that the apertures in the front of the magazine 15 are open only when the magazine is in operating position within the projector. At other times these apertures are closed so that dust and dirt cannot enter the magazine and damage the film. To accomplish this one flexible shutter plate 141 is slidably mounted in the top of the magazine cover 61 (see FIG. 9) and a second flexible shutter plate 142 is slidably mounted at the bottom of the magazine cover 62 (see FIG. 8). The shutter plate 141 slides across the aperture 109 so as to close and seal this opening. The shutter plate 142 slides upwardly so as to close the apertures 119, 123.

In order to open and close the shutters as the magazine is inserted and withdrawn from the projector, each shutter plate is provided with a spaced pair of projections 143, 144 which cooperate with leaf spring operators 145, 146. The projections 143, 144 on the plate 141 extend upwardly through a slot 147 formed in the top of the cover 61, and the projections on the plate 142 extend downwardly through a similar slot 148 formed in the bottom of the cover 62. The resilient operator 145 is secured to the underside of the shutter housing 142 and the operator 146 is mounted on the projector base frame plate 30.

When the magazine 15 is inserted into the projector 10, the operators 145, 146 first strike the tapered forward portions 149 of the respective projections 143. The operators are thus cammed over these projections and are trapped between the pairs of projections 143, 144. Further movement of the magazine into the projector thus draws the shutter plates 141, 142 rearwardly with respect to the magazine so that the apertures 109, 119 and 123 are fully opened when the magazine reaches operating position.

When the magazine is withdrawn from the projector, the engagement of the operators 145, 146 with the rear sides of the projection 143 will pull the respective shutter plates 141, 142 forwardly with respect to the magazine until the front apertures in magazine are fully closed. At this time, the projections 143 reach the dotted line position shown in FIG. 9 whereat they are tilted slightly forwardly so that the operators 145, 146 slide easily over the projections to completely release the magazine. It can therefore be seen that insertion and withdrawal of the magazine 15 in the projector 10 is effective to automatically open and close the access apertures in the magazine so that the film is only exposed when it is actually being projected.

The Sound Stabilizer

In the projector and magazine embodying the invention, structural provision is made for stabilizing the rate of travel of the film through the sound gates 115, 116. In the preferred embodiment, the sound stabilizer takes the form of a flywheel 150 (see FIG. 2) which is secured to a shaft 151 that is journaled through the gear box 32. Positioned on the opposite end of the shaft 151 is a soft roller 152 which is adapted to enter an aperture 153 in the magazine 15 and contact the film being drawn through the sound gates. The aperture 153 is normally closed by the shutter plate 142 and is opened only when the magazine is moved into operating position.

In order to hold the film against the roller 152, a shoe 154 is mounted on a bracket 155 slidably carried on the frame plate 60 of the magazine 15 (see FIG. 7). A tensioned helical spring 156 urges the shoe 154 to the left in FIG. 7 so that rollers 157 journalled on the shoe press the film against the soft roller 152.

It will therefore be apparent that as the sprocket 80 draws the film through the sound gates 115, 116, the motion of the film past the soft rubber 152 will be effective to rotate this roller and thus drive the flywheel 150. The inertia of the flywheel, once it has started rotating, will resist any tendency of the film to slow down or speed up as it is pulled through the film gates. The film thus moves smoothly through the film gates without jerkiness or uneven motion, and the sound tracks thus can be accurately reproduced.

The Film Advancing Intermittent

In the projector and magazine of the present invention, insertion of the magazine 15 into operating position couples the film to an intermittent mechanism 160 which is effective to advance the film through the picture gate 105 in discrete steps in the manner well known to those skilled in the art. In the preferred embodiment, the intermittent 160 is slidably mounted on the side of the gear case 32 so that the projected film may be properly "framed."

The intermittent includes a shuttle 161 carrying a claw 162 at its lower end having fingers 163 which, when the magazine is in operating position, are adapted to enter an elongated aperture 164 in the magazine cover 61 and engage the film perforations. The shuttle 161 imparts a standard 4-way type of motion to the fingers 163 of the claw. That is, the fingers enter the magazine near the top of the aperture 164, engage the film perforations in the film gate, draw the film downwardly through the film gate, swing outwardly of the aperture near its bottom, and move upwardly to repeat the cycle. In this way the film is advanced through the picture gate one frame at a time.

In order to impart the desired motion to the shuttle 160, the shuttle is journaled for rotational as well as axial movement in bearings 164, 165 mounted at the opposite ends of an intermittent housing 166.

The shuttle includes a cage-like center portion 167 which surrounds a compound cam 168 mounted on a shaft 169. The shaft 169 is driven by the drive motor 33 through the gear box 32 in any suitable manner.

The compound cam 168 is provided with both a peripheral cam surface 170 and a face cam surface 171. A roller 172 journaled on the shuttle 161 is urged upwardly into engagement with the peripheral cam surface 170 by a compressed helical spring 173, and a pin 174 is carried by one side of the shuttle cage portion 167 so as to engage the face cam surface 171.

It can therefore be seen that as the shaft 169 is constantly rotated by the drive motor 33, the cam surface 170 reciprocates the shuttle 161 while simultaneously the face cam 171 rotates the shuttle. The cam surfaces are coordinated so that the desired 4-way type motion of the film engaging fingers 163 is obtained.

The Projection Lamp and Condenser Assembly

The projection lamp and condenser assembly 31, which provides a projecting light beam for the projector 10, includes a standard lamp 180 mounted in a lamp housing 181 designed to dissipate the heat generated by the lamp. The lamp housing includes a corrugated metallic cylinder 182, preferably formed of aluminum, which encloses the lamp 180 and fits within a transparent cylinder 183 formed preferably of heat resistant glass.

The corrugated cylinder 182 is effective to reflect back heat radiation from the lamp 180, while the surrounding transparent cylinder 183 is effective to funnel cooling air upwardly around the lamp. Openings 182a in the cylinder 182 emit light from the lamp 180 for film projection.

Entirely surrounding the two cylinders 182, 183, is a chimney 184 which extends upwardly to the top of the projector case 16. A louvered grid 185 covers the top of the chimney 184 and permits air but not a shaft of light, to escape through an upper opening 186 in the projector case.

The projector embodying the present invention, is provided with a condenser system 190 effective to produce a cool beam of light which may be safely passed into a closed film magazine without dangerously overheating the film. In the preferred embodiment, the condenser system 190 includes a first parabolic condenser lens 191 which produces a parallel beam of light from the light rays diverging from lamp 180. The parallel light beam is directed against a heat transmitting interference reflector 192. The reflector 192 reflects visible light rays and transmits those wave lengths representing radiant heat energy.

The still parallel ray light beam is next directed against a heat reflecting interference filter 193 that is effective to transmit visible light and reflect radiant heat energy. The light rays are then converged by a second parabolic condenser lens 194 onto the film in the magazine 15. In the illustrated embodiment, a pair of heat absorbing filters 195, 196 are also positioned beyond the condenser lens 194 so as to further cool the light beam before it enters the magazine.

The interference reflector 192 and the interference filter 193 are standard optical parts well known to those skilled in the art. It is a well known phenomenon that such optical elements perform most effectively in separating light from heat when the rays of radiation strike them at a particular predetermined angle. That is, the interference reflector 192 and the interference filter 193 perform most effectively on light rays which strike them at one certain angle of incidence. Thus, by utilizing the parabolic condenser lenses 191, 194 to create a parallel beam of light and by mounting the filter and reflector in this parallel beam so that the light rays strike them at their most effective angles of incidence, a particularly effective light cooling system is obtained.

As a practical example of the cooling effectiveness of a condenser system embodying the invention, it has been found that a 16 mm. film can be "still framed" for as long as fifteen minutes in the concentrated light beam of a 500 watt lamp without having the film becoming overheated.

The Blower Cooling System

In the illustrated embodiment, a turbine type blower 200, powered by a small motor 201, is mounted on the projector frame base plate 30 and is enclosed by an air duct 202 (see FIG. 3). The air duct 202 extends beneath the plate 30 to a position underlying the lamp housing 181 and a suitable aperture (not shown) is provided in the base plate so that air propelled by the blower 200 is directed upwardly through the lamp housing for cooling purposes. If desired, extensions of the duct 202 can be provided to direct cooling air streams upwardly through the condenser system 190 and to any of the electronic assemblies.

The Projector Control System

Figures 14, 14A, 14B:
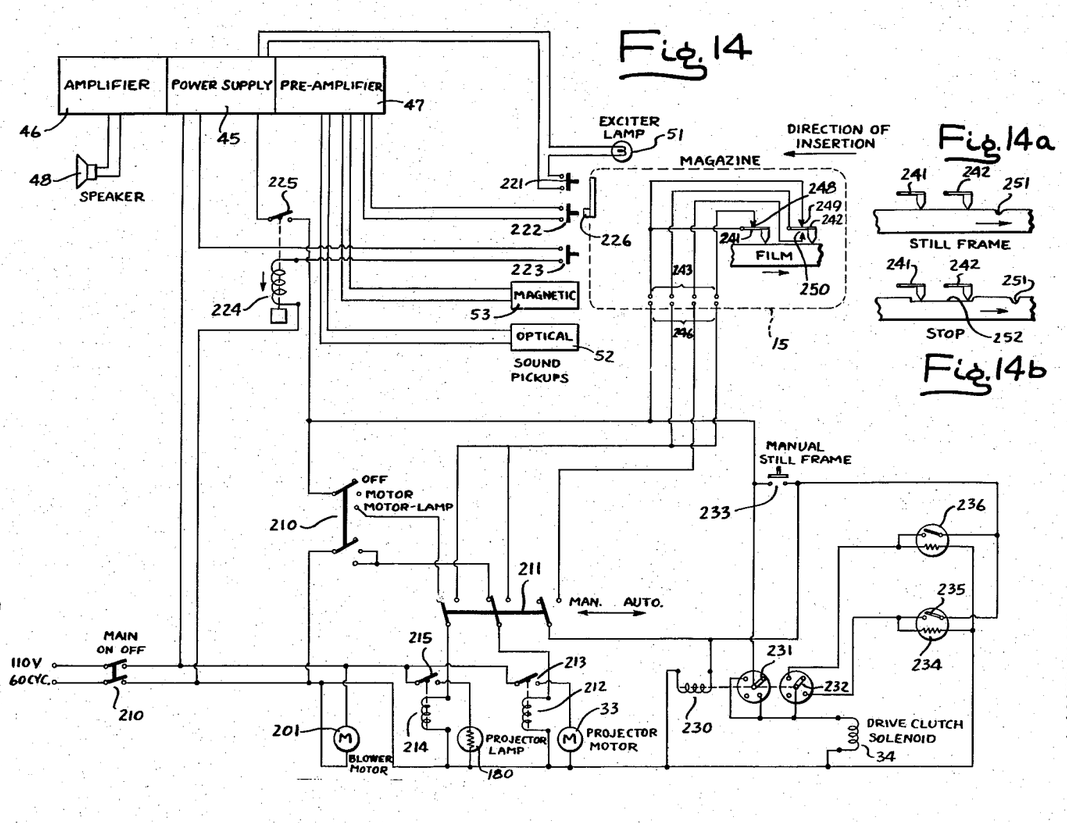
FIG. 14 is a schematic wiring diagram of the control system for the projector shown in FIG. 1.
FIGS. 14a and 14b are enlarged diagrammatic partial views of an area generally designated as 15 in FIG. 14 and indicate control notches on the film for presenting a "still frame" and a "stop" signal.

Considering now the preferred control circuit for the projector 10 embodying the invention and with particular reference to FIG. 14, it will be observed that the electronic components including the power supply assembly 45, the amplifier 46, and the pre-amplifier 47 are brought into operation by closing a main switch 210. Closing of this switch also energizes the blower motor 201. The projector lamp 180 and the main drive motor 33 are under the control of a 3-position switch 210, and the control circuit is also provided with a "Manual-Automatic" switch 211.

With the switch 211 in the "Manual" position, movement of the switch 210 from the "Off" to the "Motor" position completes a circuit to a relay 212 which, when picked up, closes contacts 213 and energizes the projector motor 33. Movement of the switch 210 to the "Motor-Lamp" position not only is effective to cause continued operation of the motor 33 but also completes a circuit to a relay 214, which when picked up, closes contacts 215 and lights the projector lamp 180. The use of the relays 212, 214 permits the control circuit to utilize low, easily controlled voltages.

One of the features embodied in the control circuit of the invention is that insertion of the magazine 15 into the projector conditions the projector for operation and also automatically determines whether the magnetic or the optical sound pickups will be brought into play. For the above purposes, three switches 221, 222, 223 are mounted on the projector so as to be engaged by the magazine when the latter is moved into its normal operating position. When the magazine 15 closes the switch 223, a circuit is completed to a relay 224, which, when picked up, closes contacts 225 to activate the projector control circuit. The relay 224 is preferably of the "time delay pickup" type so that a predetermined length of time passes after the relay is energized before the contacts 225 are closed. This time delay permits the electronic components 45, 46, and 47 to warm up before the control circuit is conditioned for operation. Thus, projection of the film cannot be begun until the electronic sound reproducing units are ready to perform.

The switches 221, 222 are alternately operated by a button 226 slidably mounted on the magazine cover 61 (see FIG. 5). When the button is slid to its "Optical" position it will engage the contact 221 when the magazine is slid into operating position, and this will complete a circuit to the exciter lamp 51 so that an optical sound track on the film can be read. When the button 226 is slid to its "Magnetic" position, it engages the switch 222 when the magazine is slid into operating position and this energizes a standard oscillator circuit in the preamplifier 47 which conditions the magnetic sound pickup 53 for operation so that a magnetic sound track on the film can be read.

Thus, when a loop of film is loaded into the magazine 15, the button 226 is positioned in accordance with the type of sound track carried by the film. Thereafter, the operator merely inserts the magazine in the projector and the projector is automatically properly conditioned to read the type of sound track provided.

In the preferred embodiment, a pin 227 (see FIG. 5) is associated with the button 226 so that when the button 226 is slid into its "Optical" position, the pin 227 extends across the aperture 119 in the magazine to prevent the resiliently mounted magnetic sound pickup 53 from entering the aperture. Thus, contact of the magnetic pickup with the film when the film has an optical sound track is avoided.

For the purpose of "still framing" the film in the magazine 15 during projection so that a single image remains on the screen for a fixed period of time, the control circuit includes a stepping relay 230 which controls a pair of contact arms 231 and 232. The relay 230 is a standard unit effective to rotate the contact arms 231, 232 one step each time the relay is energized. Repeated energization of the relay 230 is therefore effective to rotate the contact arms from contact to contact through a complete circle.

To "still frame," a Manual Still Frame push button 233 is depressed completing a circuit which energizes the relay 230. This steps the contact arm 231 around from the "Off" position so as to complete a circuit energizing the drive clutch solenoid 34. Energization of this solenoid declutches the projector drive motor 33 and the film advance is interrupted.

Energization of the relay 230 also advances the contact arm 232 one step, which, from the FIG. 14 position of the arm, completes a circuit to a time delay relay 234 which preferably is of the thermal type. In a practical embodiment, the relay 234 is selected so that five minutes after its resistance coil is energized, the relay closes the contacts 235. This completes a circuit through the contact arm 231, the contact arm 232, and the contacts 235 which again energizes the relay 230. This second energization of the relay swings the contact arm 231 to an "Off" position so as to deenergize the clutch solenoid 234, and also swings the contact arm 232 so as to deenergize film relay 234. Thus, normal operation of the projector is resumed.

In order to permit the relay 234 to cool and thus reliably operate the next time it is called upon, a second thermal relay 236 is provided which is identical to the relay 234. It can be seen that the contact arm 232 will alternately bring into play the two thermal relays 234, 236 so that while one is in operation the other may be cooling down to a normal initial temperature. In this way the projector may be repeatedly still framed, at close intervals, for reliably predetermined periods.

In the projector and magazine embodying the present invention, structural provision is made for automatically controlling the operation of the projector by indicia on the film itself. For this purpose, a pair of film edge engaging levers 241 and 242 are provided (see FIGS. 7 and 14). In the illustrated embodiment, the film is directed through a contact gate 243 by the pins 86 and the plurality of rollers 85 so that the contacts 241, 242 rest upon one side edge of the film.

In order to couple the levers 241, 242 to control circuit when the magazine 15 is inserted into the projector, a set of electrical contacts 243 are mounted on the magazine center frame plate 60 projecting outwardly of the cover 62 through an insulating plate 244. The plate 244 and the projecting ends of the contacts 243 are positioned at the ends of a series of parallel grooves 245 formed in the outer surface of the cover 62 of the magazine.

Mounted on the gear case 32 is a second set of electrical contacts 246 (see FIGS. 10 and 14) which, when the magazine 15 is inserted into operating position, engage the contacts 243 and couple the film engaging levers 241, 242 to the control circuit of the projector. As the magazine is being inserted, the grooves 245 prevent the contacts 246 from being electrically "shorted" against the cover plate of the magazine.

When it is desired to operate the projector under the control of the film, the switch 211 is moved to its "Automatic" position. It will be observed that the switch 210 thereafter has no control of the projector. The magazine is then slid into operating position which operates the switch 223 so as to close the contacts 225 after the electronic assemblies have been warmed up by the time relay 224. When the switch 225 closes, circuits are completed to the relays 212 and 214 through the switch 211 and parallel contacts 248, 249 held closed by the levers 241, 242. The drive motor 33 and the projector lamp 180 are therefore energized, and projection of the film begins.

At those portions of the film program at which it is desired to "still frame" the projected image, a single notch 251 is cut into the side edge of the film engaged by the levers 241, 242. As the film edge moves under the lever 242, the lever momentarily closes the contacts 250 which completes a circuit through the switch 211 energizing the locking relay 230. The projector is thus still framed in the manner described previously.

It will be noted that when a single short notch 251 passes beneath the film edge engaging lever 241 the contacts 248 are opened, but since at this instant the contacts 249 are closed, operation of the projector lamp and the drive motor will not be interrupted. Likewise, when the lever 242 drops in the notch to close the contacts 250, it will be noted that although the contacts 249 simultaneously open, the contacts 248 are closed and operation of the projector lamp and the drive motor are not affected.

It will be appreciated that during still framing, the film will not stop with the notch 251 positioned beneath the lever 242 because of the inherent inertia of the film driving elements and the resulting lag between the closing of the contacts 250 and the stopping of the film. The notch 251 only briefly closes the contacts 250 and the projector is ready for operation when one of the thermal time delay relays 234, 236 again steps the relay 230.

At the end of the film program when it is desired to stop the projector, a short still framing notch 251 is provided followed by a longer stop notch 252 in the side edge of the film. When this portion of the film passes beneath the film edge engaging levers 241, 242, the short notch 251 will momentarily close the contacts 250 so as to initiate a still framing cycle. When the film comes to a halt, both of the contacts 241 and 242 will lie in the long notch 252 and thus both of the sets of contacts 248 and 249 will be opened. This will deenergize the drive motor 33 and the projector lamp 180 so that even after deenergization of the drive clutch solenoid 34 following the still frame cycle, the projector will not resume operation.

Briefly reviewing the control circuit, it can be seen that the entire film program can be placed under automatic control. Assuming the film has been properly notched when loaded into the magazine, the operator simply slides the magazine into the projector. The button 226 will energize the correct one of the two sound pickup devices and the magazine will close the switch 223 so as to energize the control circuit after the electronic elements are warmed up. Thereafter, the film notches 251 will be effective to operate the film edge engaging levers 241, 242 to still frame the projector at selected points during the program for predetermined time intervals as determined by the relays 234, 236. At the end of the film program, a long notch 252 will stop the projection cycle and turn off the projector lamp and the drive motor.

We claim as our invention:

1. A film magazine for use in a motion picture projector comprising, in combination, a frame plate, a pair of covers fitted on opposite sides of said plate so as to define an enclosure surrounding said plate, a pair of spaced spools disposed in said enclosure and journaled on said plate, elongated rollers journaled on said plate adjacent said spools on axes at right angles to the spool axes, other elongated rollers journaled on the cover enclosing said spools so as to form spaced pairs of parallel rollers, said spools and said roller pairs forming a substantially frictionless support for holding and feeding an endless loop of film coiled into a roll on said spools, a film sprocket journaled on said plate in said enclosure and coupled to one of said spools for rotation therewith, a gear coupled to said sprocket extending through one of said covers so that the gear may be driven to drive the sprocket and the spool coupled thereto, said frame plate having openings permitting film to be drawn directly from said driven spool and to be fed to the outside of a film loop coiled on said spools by said sprocket.

2. A film magazine for use in a motion picture projector comprising, in combination, a rigid frame plate, a pair of cup shaped covers fitted on opposite sides of said plate so as to define an enclosure divided by said plate into first and second compartments, a pair of spaced spools disposed in said first compartment and journaled on said plate, elongated rollers journaled on said plate adjacent said spools on axes at right angles to the spool axes, other elongated rollers journaled on the cover enclosing said spools so as to form spaced pairs of parallel rollers, said spools and said roller pairs forming a substantially frictionless support for holding and feeding an endless loop of film coiled into a roll, a film sprocket journaled on said plate in said second compartment and coupled to one of said spools for simultaneous rotation therewith, a gear coupled to said sprocket extending through one of said covers so that the gear may be driven to drive the sprocket and the spool coupled thereto, said frame plate having a pair of openings permitting film to be drawn by one side of said sprocket directly from said driven spool and to be fed by the other side of said sprocket to the outside of a film loop coiled on said spools, and sound and picture gates mounted on said frame plate in said compartments and arranged so that a loop of film fed out and drawn in by opposite sides of said sprocket can be moved through said gates.

3. A film magazine for use in a motion picture projector comprising, in combination, a rigid frame plate, a pair of cup shaped covers fitted on opposite sides of said plate so as to define an enclosure divided by said plate into first and second compartments, a pair of spaced spools disposed in said first compartment and journaled on said plate, one of said spools being mounted on a shaft extending through said plate, elongated rollers journaled on said plate adjacent said spools on axes at right angles to the spool axes, other elongated rollers journaled on the cover enclosing said spools so as to form spaced pairs of parallel rollers, said spools and said roller pairs forming a substantially frictionless support for holding and feeding an endless loop of film coiled into a roll, a film sprocket mounted on said extending shaft in said second compartment, a gear mounted on said shaft and extending through an aperture in one of said covers so that the gear may be driven to drive both the sprocket and the spool on the shaft, said frame plate having a pair of openings permitting film to be drawn by one side of said sprocket from said driven spool and to be fed by the other side of said sprocket to the outside of the film loop coiled on said spools, and sound and picture gates mounted on said frame plate in said compartments and arranged so that a loop of film fed out and drawn in by opposite sides of said sprocket can be moved through said gates.

4. A film magazine for use in a motion picture projector comprising, in combination, a frame defining an enclosure, a support in said enclosure for an endless loop of film coiled into a roll, means including a sprocket journaled in the enclosure for drawing out and feeding back film from the coil so as to maintain an open loop, a picture gate in said enclosure adjacent an aperture in the cover, a sound gate in said enclosure adjacent a second aperture in the cover, said gates lying in adjacent planes at one end of said frame, and means within said enclosure for guiding said open loop so that it passes through said picture gate with the front of the film facing the adjacent cover aperture and through said sound gate with the rear of the film facing the adjacent case aperture so that both optical and magnetic sound tracks on the film can be sensed as the film is projected.

5. A film magazine for use in a motion picture projector comprising, in combination, a central plate enclosed on each side by a cover so as to form a two compartment enclosure, a support mounted in one of the compartments for an endless loop of film coiled into a roll, means including a sprocket journaled in the other of said compartments for drawing out and feeding back film from the coil so as to maintain an open loop, a picture gate in one of the compartments adjacent an aperture in the cover, a sound gate in one of said compartments adjacent a second aperture in the cover, and means within said enclosure for guiding said open film loop so that it passes through said picture gate with the front of the film facing the adjacent cover aperture and through said sound gate with the rear of the film facing the adjacent cover aperture so that either optical or magnetic sound tracks on the film can be sensed as the film is projected.

6. A film magazine for use in a motion picture projector comprising, in combination, a central plate enclosed on each side by a cover so as to form a two compartment enclosure, a support mounted in one of the compartments for an endless loop of film coiled into a roll, means including a sprocket journaled in the other of said compartments for drawing out and feeding back film from the coil so as to maintain an open loop, a picture gate in one of the compartments adjacent an aperture in the cover at the front end of the magazine, a sound gate in the other of said compartments adjacent a second aperture in the cover at the front end of the magazine, an opening in said frame plate, and means within said enclosure for guiding said open film loop so that it passes through said picture gate with the front of the film facing the adjacent cover aperture and is doubled back through said opening so as to pass through said sound gate with the rear of the film facing the adjacent cover aperture so that either optical or magnetic sound tracks on the film can be sensed as the film is projected.

7. In a motion picture projector, the combination comprising a frame, means on said frame defining a slideway having a closed end, a magazine having a front wall and being slidably fitted in said slideway with said front wall facing said closed end, means in said magazine for supporting and feeding an endless loop of film, a sound gate in said magazine adjacent said magazine front wall, a sound pickup device at said closed end of the slideway in register with said sound gate, a film back-up member in said magazine adjacent said sound gate and behind the magazine front wall, a film contacting roller journaled on said frame at said closed slideway end, said roller extending into said aperture and against said member, a flywheel journaled in said frame and coupled to said roller, and means in said magazine, for directing film through said sound gate and between the roller and the member.

8. In a motion picture projector, the combination comprising a frame, means on said frame defining a slideway open at one end and closed at the other end, a magazine slidably fited in said slideway and having a front wall, means in said magazine for supporting an endless loop of film wound into a coil, a sprocket in said magazine for feeding film from and to said coil, a first gear coupled to said sprocket and projecting from said magazine, driving means including a driven gear journaled on said frame so as to mesh with said first gear when the magazine is slid to operating position at said closed end of the slideway, a sound gate in said magazine adjacent said front wall, a sound pickup device at said closed end of the slideway to register with said sound gate when the magazine is slid into said operating position, a spring biased shoe in said magazine adjacent said sound gate and positioned behind the magazine front wall, a film contacting roller journaled on said frame at said closed slideway end so as to enter said aperture and force said biased shoe back from the wall, a flywheel journaled in said frame and coupled to said roller, and means for directing film from said sprocket through said sound gate and across the front of said shoe.

9. In a motion picture projector, the combination comprising a frame, means on said frame defining a slideway open at one end and closed at the other end, a magazine having a front wall and being slidably fitted in said slideway with said wall facing said closed end, means including a first gear in said magazine for supporting and feeding an endless loop of film, said first gear projecting from said magazine, driving means including a driven gear journaled on said frame in meshing engagement with said first gear, a sound gate in said magazine adjacent said magazine front wall, a sound pickup device at said closed end of the slideway in register with said sound gate, a spring biased shoe in said magazine adjacent said sound gate and behind the magazine front wall, a film contacting roller journaled on said frame at said closed slideway end, said roller extending into said aperture so as to force said biased shoe back from the wall, a flywheel journaled in said frame and coupled to said roller, and means in said magazine for directing film through said sound gate and between said roller and said shoe.

References Cited in the file of this patent

UNITED STATES PATENTS

| | | |
|---|---|---|
| 2,034,176 | Doino | Mar. 17, 1936 |
| 2,042,027 | Simons | May 26, 1936 |
| 2,124,587 | Morrissey | July 26, 1938 |
| 2,214,468 | Lannerd | Sept. 10, 1940 |
| 2,238,719 | De Tartas | Apr. 15, 1941 |
| 2,269,952 | Morgan | Jan. 13, 1942 |
| 2,341,313 | Chedister | Feb. 8, 1944 |
| 2,464,965 | Chemel | Mar. 22, 1949 |
| 2,552,184 | Koch | May 8, 1951 |
| 2,552,185 | Koch | May 8, 1951 |
| 2,781,689 | Heyer | Feb. 19, 1957 |